R. M. SELLECK.
Harness-Pad.
No. 211,478.  Patented Jan. 21, 1879.
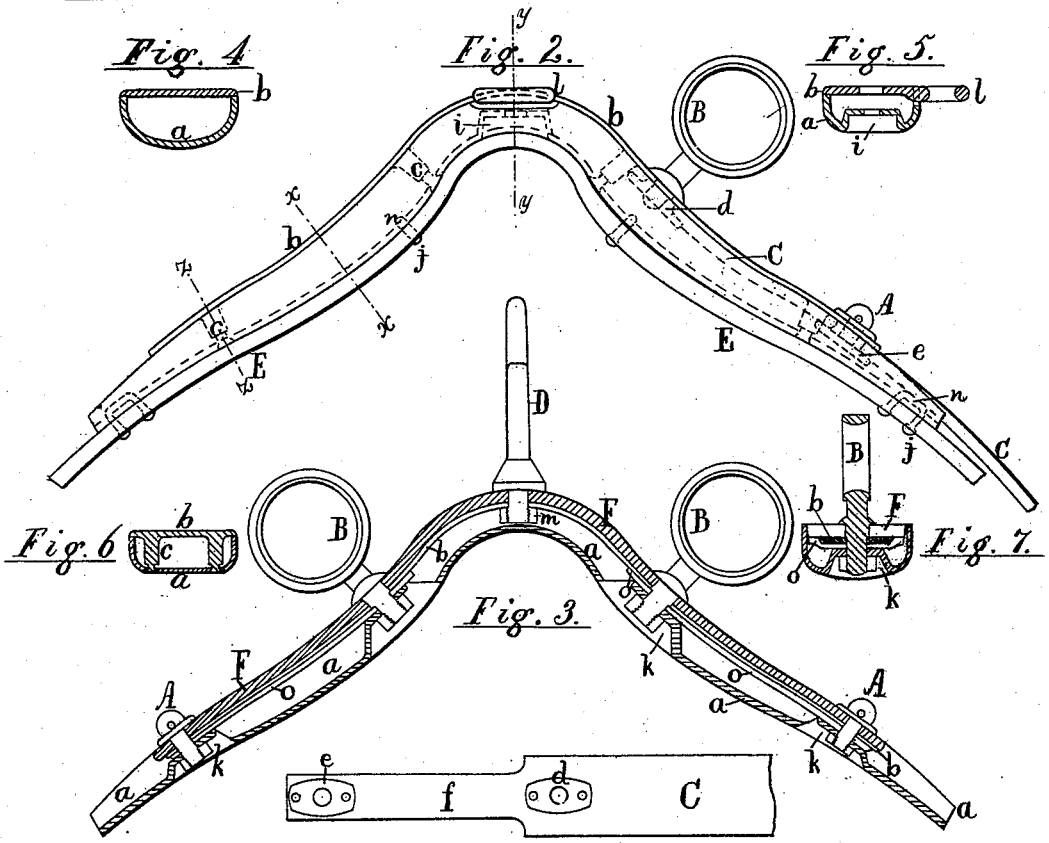

UNITED STATES PATENT OFFICE.

ROBERT M. SELLECK, OF NEWARK, NEW JERSEY.

IMPROVEMENT IN HARNESS-PADS.

Specification forming part of Letters Patent No. 211,478, dated January 21, 1879; application filed June 15, 1878.

*To all whom it may concern:*

Be it known that I, R. M. SELLECK, of Newark, in the county of Essex, New Jersey, have invented a new and useful Improvement in Harness Pad or Saddle, which improvement is fully described in the following specification:

My invention consists of a harness pad or saddle shaped to imitate the form of a stuffed pad, and finished to look well without covering of leather, rubber, or other material, the surface being merely plated, polished, or japanned.

I also adopt a mode of construction expressly adapted for a pad made exclusively of metal, modifying the same very slightly when a leather housing is used upon the saddle.

My imitation pad is made of only two pieces, thereby securing the utmost economy in construction, and is fully shown in the accompanying drawings, wherein—

Figure 1 is a plan of the pad attached to a sweat-cloth. Fig. 2 is a side elevation of the same; Fig. 3, a sectional elevation of a pad provided with housings; Fig. 4, a section on line $x$ $x$ in Fig. 2. Fig. 5 is a section on line $y$ $y$, and Fig. 6 a section on the line $z$ $z$, through the rivets in Fig. 2, while Fig. 7 is a section of the housing and socket for the pad-screw shown in Fig. 3.

$a$ is the bottom of the pad, made in one piece from end to end, and shaped on the under side in imitation of a stuffed pad, so that when japanned black it closely resembles a stuffed pad covered with patent leather.

The bottom being cast of thin metal, the interior corresponds in shape to the outside, and has a hollow channel extending its whole length.

The section in Fig. 4 shows its shape about midway of its length; but the shape may be varied, if the appearance of a stuffed pad be preserved.

The top plate, $b$, is made in one piece also, bent to the necessary shape, and is secured to the bottom by rivets $c$, or in any suitable manner, leaving an open space beneath it, which varies in depth as the bottom is modified in imitation of a stuffed pad.

The plate $b$ is perforated for the rein-hook D, terrets B, and pad-screws A, and the nuts for the latter are secured in the end of the side strap, C, which is shown in Fig. 2, but detached from its place in Fig. 1, and shown separately in plan in Fig. 1ª, that the lines in Fig. 1 may not be crowded. In this figure the terret-nuts $d$ and pad-screw nuts $e$ are shown tacked upon a prolongation, $f$, of the side strap C, by which means they can be readily inserted or withdrawn at pleasure from the space or channel beneath the plate $b$ when riveted to the bottom $a$.

The bottom $a$ is provided with holes, as in Figs. 1 and 2, for the rivets $c$, and has a recess, $i$, provided in its under side to receive the nut $m$ for the rein-hook D.

Holes may also be made in the bottom, as at $g$; to lighten it, and when the pad is secured to a sweat-leather or cloth, E, holes $h$ are provided in the bottom of $a$, and threads $n$ passed through the holes and tufted on the under side of the cloth, as at $j$.

The crupper-hook $l$ is shown in the drawings as formed upon the top plate $b$; but it may be cast upon the bottom plate, if preferred, or made separate, and inserted beneath the cap-plate and fitted around the rein-hook D in the usual way. When thus constructed the side straps C would be secured, as described above, beneath the plate $b$, which, if japanned, would appear to be of bright black leather, and if polished or plated, would contrast finely with the strap C; but when the pad is used with a housing, as shown in Fig. 3, the side straps C would be secured directly to the housing F.

In this figure the top plate $b$ is shown narrower than the top of piece $a$, that the housing may be secured to plate $b$, in the manner shown in Fig. 7, by stitching it at each edge to a piece of leather, $o$, placed beneath the plate $b$. When thus arranged, the top $b$ may be secured to the bottom $a$ by the terrets and pad-screws without the aid of rivets, by forming nut-sockets $k$ in the under side of $a$, and constructing the upper sides of the sockets to bear against the under side of the leather $o$ or plate $b$.

In this mode of construction I sink the housing F, secured to the top plate $b$, as described into the channel extending from end to end of piece $a$, until it is flush with the top edges of $a$, thus preserving, as closely as possible, the resemblance between my imitation pad and one covered entirely with leather, the form of the lower part and the japanning upon it matching perfectly with the leather of the housing, while the simplicity of construction is fully preserved, and the expense of stuffing the pad and covering the stuffed parts is entirely avoided.

When thus constructed with housing the top plate can be removed at any time, and the terret may therefore be secured by a nut placed against the under side of plate $b$ instead of in the socket below the arch of piece $a$.

My imitation pad will be seen from the above description to possess the following advantages: It is formed and finished so as to resemble a stuffed pad in shape, and therefore obviates the trouble and expense of stuffing a pad at each side of the saddle, while its shape is such that it appears like a stuffed pad, and answers the same purpose, especially when used with the sweat-leather E. It is also made of a continuous piece of metal, $a$, from end to end, unlike the various combinations of wood and metal hitherto made, thus securing the utmost possible economy of construction.

I am aware that a harness-pad has been made with wooden blocks covered by sheet metal, as in patent to M. E. Abbey, in 1872; but such a construction requires the use of many pieces and fastenings, which my invention is expressly intended to obviate, and I do not therefore claim a metallic pad, broadly, but only the modes of construction described, as follows:

1. The combination of the bottom $a$, shaped as herein described, and made in one piece from end to end, with the cap-plate $b$, shaped as herein described, and made in one piece from end to end, the rivets $c$, to secure the two together, the pad-screws A, terret B, and nuts $d$ and $e$, secured to the prolongation $f$ of the side straps C, as and for the purpose herein set forth.

2. In a harness-pad, the combination of a bottom, $a$, shaped as herein described, so that the metal extends continuously from the top side upon one edge of the pad under the bottom in convex shape, and up to the top side upon the opposite edge, the same being constructed in one piece from end to end, and provided with nut-sockets $k$, with the housing F fitted to the same as a cover, and stiffened by the sunken cap-plate $b$, and the terret and pad screws holding the whole together in the manner herein set forth.

In testimony that I claim the foregoing as my own I hereto subscribe my name in the presence of two witnesses.

ROBERT M. SELLECK.

Witnesses:
C. C. HERRICK,
THOS. S. CRANE.